(No Model.)
D. C. ROBINSON.
SAW JOINTER.
No. 382,327. Patented May 8, 1888.
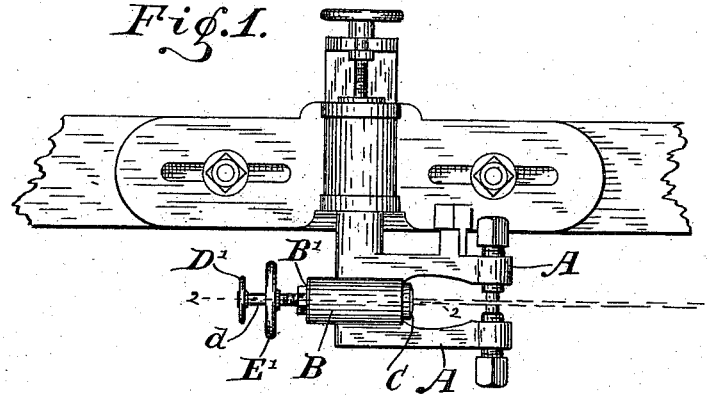
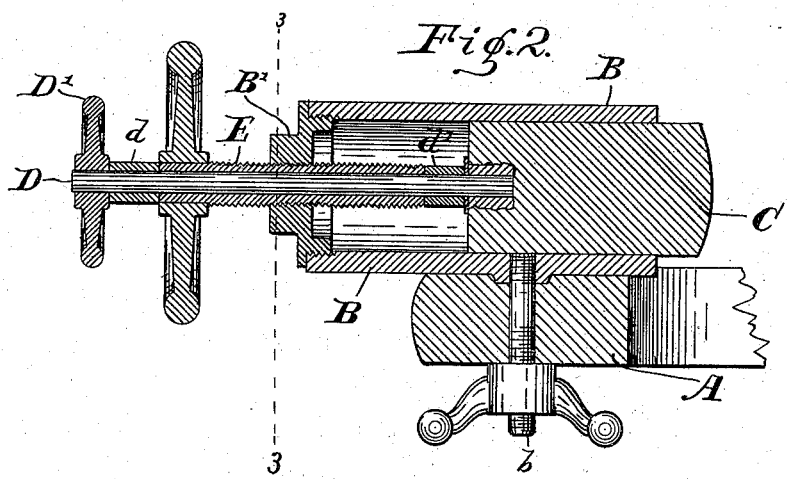
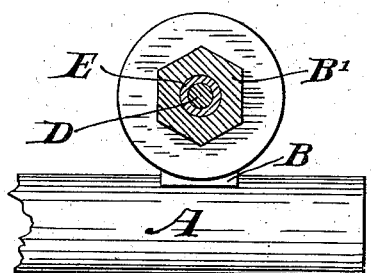
WITNESSES.
Chas N Leonard
Charles L Thurber
INVENTOR.
Don C. Robinson
PER
C. Bradford
ATTORNEY.

UNITED STATES PATENT OFFICE.

DON C. ROBINSON, OF MADISON, INDIANA, ASSIGNOR TO E. C. ATKINS & COMPANY, OF INDIANA.

SAW-JOINTER.

SPECIFICATION forming part of Letters Patent No. 382,327, dated May 8, 1888.

Application filed July 30, 1887. Serial No. 245,694. (No model.)

*To all whom it may concern:*

Be it known that I, DON C. ROBINSON, of the city of Madison, county of Jefferson, and State of Indiana, have invented certain new and useful Improvements in Saw-Jointers, of which the following is a specification.

My said invention relates to that class of jointers which are commonly attached to the saw-guide which is secured to the frame-work adjacent to a circular saw; and it consists in means whereby the operative part of such a jointer may be either turned so as to present different portions of its surface to the saw or moved toward and from the saw at the election of the operator, each operation being performed from the same point, but independently of the other. The result is accomplished by connecting to said operative part a rod, which extends out through and is connected to a hollow screw-rod, which in turn passes through a nut or internally-threaded portion attached to the casing in which said operative part is mounted.

Referring to the accompanying drawings, which are made a part hereof, and on which similar letters of reference indicate similar parts, Figure 1 is a top or plan view of a saw-jointer embodying my said invention mounted upon a guide and arranged in such relation to the saw (which is indicated in dotted lines) that it may operate thereon; Fig. 2, a longitudinal vertical section of the same on the dotted line 2 2 in Fig. 1; and Fig. 3, a transverse vertical sectional view, looking toward the left from the dotted line 3 3 in Fig. 2.

In said drawings the portions marked A represent the saw-guide; B, the casing of the jointer; C, the block or bar, of emery or other material, which constitutes the operative part of said jointer; D, the rod by which the same may be turned, and E the tubular or hollow screw-threaded rod by which it may be caused to advance or recede without turning.

The saw-guide A may be of any ordinary or desired construction, and is simply shown to illustrate the position of the jointer when in operation.

The casing B is preferably tubular in form, and has projecting therefrom a stud or bolt, b, which extends down through a hole in the guide A, by means of which it can be secured to said guide when desired, as will be readily understood. The rear end of this tubular casing is closed by a screw-cap, B', which has an opening through its center, which is also screw-threaded to receive the hollow screw-rod E, as shown most plainly in Fig. 2.

The block or bar C is, as shown, preferably cylindrical and fits closely in the casing B. It is of emery or some such material which will act properly on the teeth of the saw. It is rigidly secured to the rod D, by which it may be turned so as to present all portions of its end to the saw and thus be worn away evenly and equally.

The rod D is fastened rigidly to the bar C at one end, passes out through the hollow screw-threaded rod E, and carries a hand-wheel, D', upon its outer end, by which it may be conveniently turned. Collars or sleeves d d' hold it from longitudinal movement in its bearing in said hollow rod E.

The hollow rod E is mounted in the screw-threaded opening in the cap B', and, being located between the collars or sleeves d d' on the rod D, will, as it is turned, operate to move said rod D, and with it the block C, back and forth, as it itself is drawn back and forth, by the engagement of its screw-threads with those in the cap B', through which it passes. It is provided with a hand-wheel, E', by which it may be turned.

In using this invention the device is first fastened to the saw-guide A by means of the bolt b, as before described. The hollow screw-threaded rod E is then turned by means of the hand-wheel thereon until the operative part C is brought up to that position where the points of the saw-teeth, as the saw revolves, will come in contact therewith and be jointed off, as will be readily understood. In order that the part C may be worn away evenly, it is frequently turned somewhat by means of the rod D and the hand-wheel thereon, thus presenting all portions of the surface of the end nearest the saw to the operation of the saw-teeth.

Having thus fully described my said invention, what I claim as new, and desire to secure by Letters Patent, is—

1. The combination, in a jointer for jointing circular saws, of a casing, an operating part with which the saw comes in contact, a rod rigidly secured to said operating part, by which the same may be turned in its casing, and a hollow screw-threaded rod surrounding the first rod loosely and passing through a screw-threaded bearing, whereby said operating part may be drawn back and forth or revolved, each operation being independent of the other, substantially as set forth.

2. The combination, in a saw-jointer, of the tubular casing B, the emery or other operating part C therein, the rod D, rigidly secured to said part C and extending to outside the casing, and the hollow screw-threaded rod E, surrounding said rod D between collars or sleeves thereon, and passing through a screw-threaded bearing on said casing, substantially as set forth.

3. The combination, in a saw-jointer, of the part C, mounted to be rotated and adjusted longitudinally, and the means for accomplishing said rotation and said longitudinal adjustment each independent of the other, substantially as set forth.

4. The combination, with the operating part C of a saw-jointer, of a rod, D, rigidly secured thereto, a screw-threaded hollow rod, E, surrounding said rod D, and sleeves or collars $d$ and $d'$ on said rod D, between which the hollow screw-threaded rod E is placed and operates, each of said rods D and E being provided with hand-wheels, substantially as set forth.

In witness whereof I have hereunto set my hand and seal, at Madison, Indiana, this 26th day of July, A. D. 1887.

DON C. ROBINSON. [L. S.]

In presence of—
 LEANDER M. ROBINSON,
 THOMAS J. HUMPHREYS.